(12) United States Patent
Walczak (10) Patent No.: US 6,203,309 B1
(45) Date of Patent: Mar. 20, 2001

(54) APPARATUS FOR EMBOSSING PAINT ROLLERS

(75) Inventor: Walter A. Walczak, Brooklyn Park, MN (US)

(73) Assignee: Wagner Spray Tech Corporation, Minneapolis, MN (US)

( * ) Notice: Subject to any disclaimer, the term of this patent is extended or adjusted under 35 U.S.C. 154(b) by 0 days.

(21) Appl. No.: 09/131,977

(22) Filed: Aug. 10, 1998

(51) Int. Cl.[7] .................................................. B29C 59/02
(52) U.S. Cl. ........................ 425/385; 425/293; 425/374; 425/392; 425/393; 425/402
(58) Field of Search ..................... 425/385, 392, 425/402, 374, 393; 264/293

(56) References Cited

U.S. PATENT DOCUMENTS

| | | | |
|---|---|---|---|
| 3,646,648 | * 3/1972 | Kappelman et al. | 29/76 |
| 3,649,151 | * 3/1972 | Mathews | 425/385 |
| 3,777,631 | * 12/1973 | Trask | 93/81 R |
| 4,119,020 | * 10/1978 | Sharp et al. | 99/339 |
| 4,551,297 | * 11/1985 | Botcher et al. | 264/224 |
| 4,771,845 | * 9/1988 | Shimizu | 180/79.1 |
| 4,818,460 | * 4/1989 | Nied | 264/310 |
| 4,867,000 | * 9/1989 | Lentz | 74/89.15 |
| 4,976,484 | * 12/1990 | Nomaru et al. | 294/119.1 |
| 5,093,596 | * 3/1992 | Hammer | 310/191 |
| 5,111,709 | * 5/1992 | Torii et al. | 74/89.15 |
| 5,137,411 | * 8/1992 | Eul et al. | 414/462 |
| 5,266,257 | * 11/1993 | Kildune | 264/224 |
| 5,533,880 | * 7/1996 | Hayakawa et al. | 425/328 |
| 5,588,554 | * 12/1996 | Jones | 221/88 |
| 5,713,095 | * 2/1998 | Wakat | 15/230.11 |
| 5,769,153 | * 6/1998 | Ayers | 164/479 |
| 5,980,802 | * 11/1999 | Wakat et al. | 264/219 |

* cited by examiner

Primary Examiner—Harold Pyon
Assistant Examiner—Joseph S Del Sole
(74) Attorney, Agent, or Firm—Faegre & Benson, LLP (57) ABSTRACT

An apparatus for embossing a cylindrical object such as a paint roller cover. The apparatus includes a shuttle and a rotatable shaft on the shuttle. The rotatable shaft includes two ends, with one end accepting a paint roller cover and with the other end being toothed for engagement with a gear rack. As the rotatable shaft is drawn in one direction by the shuttle, the toothed end engages the gear rack and rotates the rotatable shaft, thereby also rotating the paint roller cover. As the paint roller cover rotates, it is drawn by the shuttle over a die transfer plate having a design formed therein, and such design is transferred to the paint roller cover. The die transfer plate is heated to the desired temperature, and the speed of the shuttle is controllable so that time and temperature is controlled. Another controlled parameter is pressure. A method for embossing cylindrical objects is also disclosed.

28 Claims, 12 Drawing Sheets

APPARATUS FOR EMBOSSING PAINT ROLLERS

The present invention relates generally to embossing apparatus, particularly to embossing cylindrical objects, and specifically to embossing paint roller covers.

BACKGROUND OF THE INVENTION

U.S. Pat. No. 5,713,095 discloses a bifurcated paint roller tool. The paint roller tool includes a pair of paint rollers wherein each of the paint rollers is rotatable independently of the other paint roller. The tool cooperates with a bifurcated paint tray such that each of the paint rollers is dippable in paint of a different color. The tool is then turned while rolling paint on a wall to mix the different colors while the paint is wet to produce a rag rolling like random paint effect. Each of the paint rollers includes a paint roller cover which is slideable on and off of the tool so that new or clean paint roller covers may be used. Such paint roller covers may include designs so as to add random or relatively ordered designs to the wall. As to such paint rollers or paint roller covers having designs or patterns, U.S. Pat. No. 5,713,095 issued Feb. 3, 1998 is hereby incorporated by reference in its entirety.

SUMMARY OF THE INVENTION

A feature of the present invention is an embossing apparatus for impressing designs into cylindrical objects.

Another feature is an embossing apparatus for impressing designs into the naps of paint roller covers.

Another feature is an embossing apparatus that simultaneously draws and rolls a cylindrical object over a die transfer plate.

Another feature is an embossing apparatus that includes a shuttle for drawing the cylindrical object over the die transfer plate.

Another feature is an embossing apparatus that includes a rotatable shaft on the shuttle, where the rotatable shaft engages the cylindrical object and rolls the cylindrical object over the die transfer plate.

Another feature is an embossing apparatus that includes ejection plates for pushing the cylindrical object off the rotatable shaft after the cylindrical object has been embossed.

Another feature is a method for embossing paint roller covers where the method controls the time and temperature of the embossing and further controls the pressure of embossing so that a pressure parameter is a variable. With a third variable such as pressure, a greater scope is permitted for the parameters of time and temperature and a greater scope of substrate materials for the nap is realized.

An advantage of the present invention is efficiency. Embossing of cylindrical objects, preferably paint roller covers, is accomplished inexpensively and quickly.

Another advantage is precision. The design of the die transfer plate is transferred exactly. The die transfer plates are flat and of course have definite edges. Yet the design or patterns that are transferred have no distinguishable starting point and no distinguishable ending point.

Another advantage is that the parameters of the method are easily changed. The time of engagement between the paint roller cover and die transfer plate may be easily changed by varying the speed of the motor driving the shuttle. The temperature of the embossing may be changed by changing the temperature of the die transfer plate. The pressure of the embossing may be incrementally changed by changing the height of the die transfer plate relative to the paint roller cover. The provision of an additional parameter such as pressure permits wider ranges for embossing times and temperatures which in turn permits a greater number of different substrates to be used as the nap. The manufacturer need not rely on one nap or one nap supplier. The manufacturer may offer a greater variety of designs and substrates for the paint roller covers.

These and further objects and advantages of the present invention will become clearer in light of the following detailed description of the illustrative embodiments of this invention described in connection with the drawings.

DETAILED DESCRIPTION

As shown in FIGS. 1–12, the present apparatus for embossing paint rollers is indicated in general by reference numeral 10. In general, the apparatus 10 includes a frame 12, a base plate 14 on the frame 12, a control unit 16, a motor unit 18 for driving a first drive chain 20 and second shuttle chain 22, the latter of which is engaged to and drives a shuttle assembly 23. Shuttle assembly 23 includes a pair of shuttles 24, each of which slides on a slide bed 26 and includes a pair of rotator shafts 28. One end of each of the rotator shafts 28 frictionally receives a paint roller or paint roller cover 29 and the other end of each of the rotator shafts 28 has a spur gear 30 which meshes with a gear rack 32. Each of the rotator shafts 28 is mounted in a pair of bearings 34. As the shuttles 24 are driven by the second chain 22, the rotator shafts 28 spin in their bearings 34 and the paint rollers 29 roll over heated die transfer or embossing plates 36 having designs or patterns 37 and pick up such designs or patterns 37. After passing over the die transfer plates 36, the paint rollers 29 are ejected by ejection wiper plates 38.

More specifically, frame 12 includes a set of at least four legs 40 between which extend a set of four lower horizontally extending support members 42 and a set of four upper horizontally extending support members 44. The base plate 14 is fixed on the set of four upper horizontally extending support members 44 and includes a set of three cut-outs 46, 48, 50 through which embossed paint rollers 29 may fall after being ejected.

Control unit 16 is fixed on the base plate 14 and includes circuitry (such as a programmable logic controller, not shown) for controlling the motor unit 18 and the speed of the motor therein, the shuttling of the shuttles 24 including the speed and position of the shuttles 24, the heating of the die transfer plates 36 including the temperature of the die transfer plates 36, and the timing of the operation of the ejector wiper plates 38. Control unit 16 includes a power supply, switches, timers, temperature controls and other such mechanisms (not shown) for control and operation of the apparatus 10.

Motor unit 18 is fixed on base plate 14 and is preferably includes an electric motor. Motor unit 18 drives a toothed shaft 52 which engages the first chain 20. Motor unit 18 includes a speed reducer (not shown) where a change in the voltage changes the speed or the rpm of shaft 52. Motor unit 18 may include gearing to change the speed of shaft 52.

Figure 1:
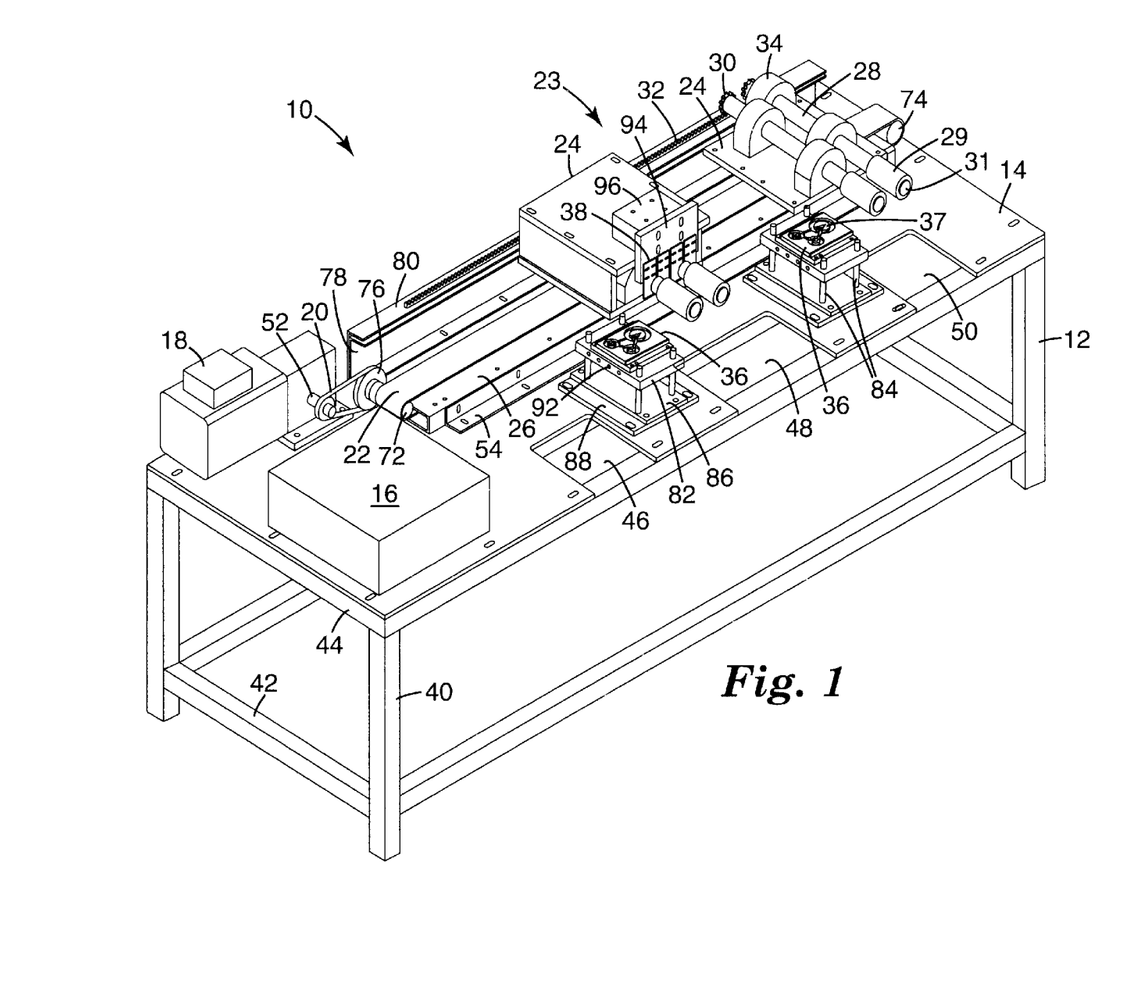
FIG. 1 is a perspective view of the present apparatus for embossing paint rollers.
Figure 2:
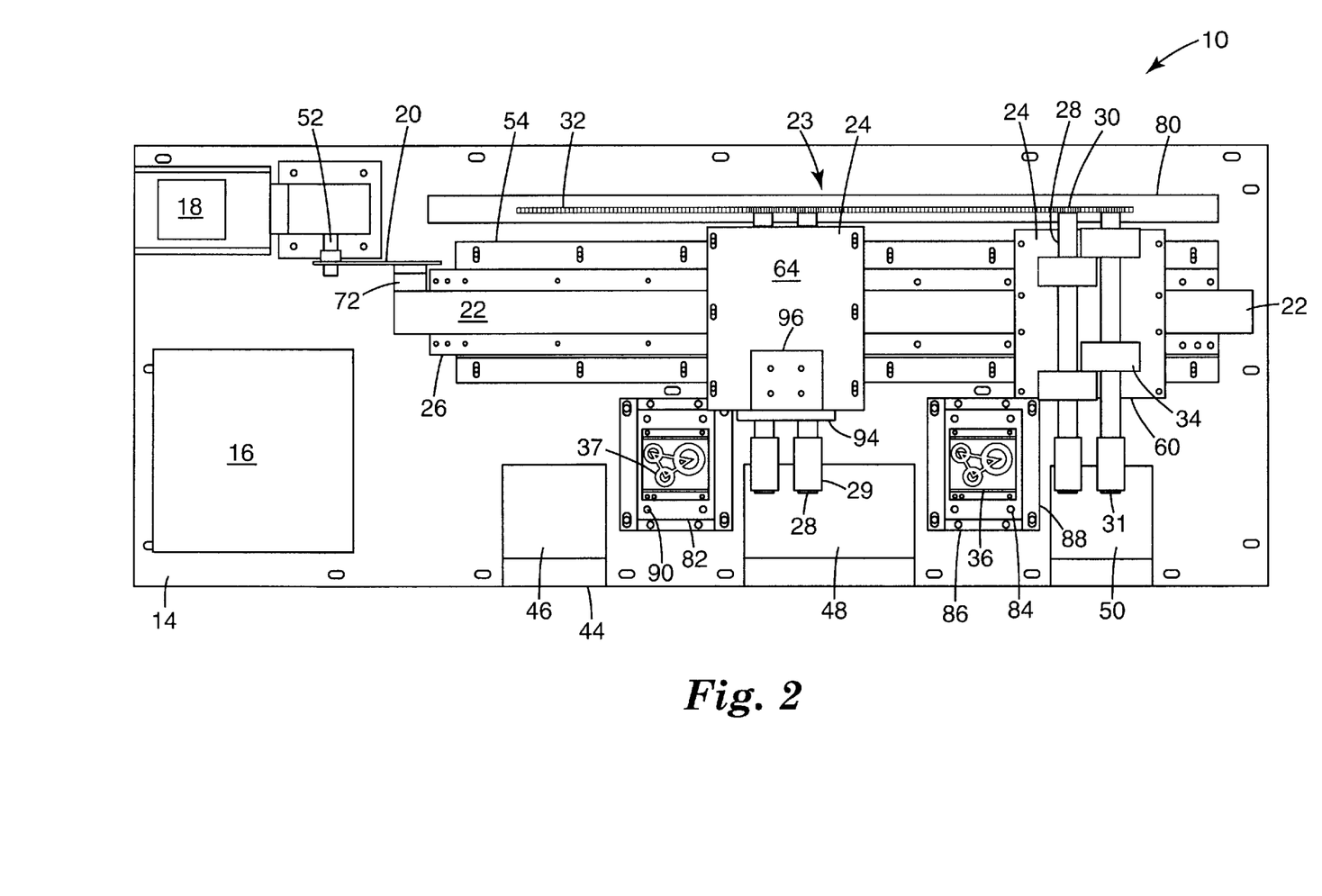
FIG. 2 is a top view of the embossing apparatus of FIG. 1.
Figure 3:
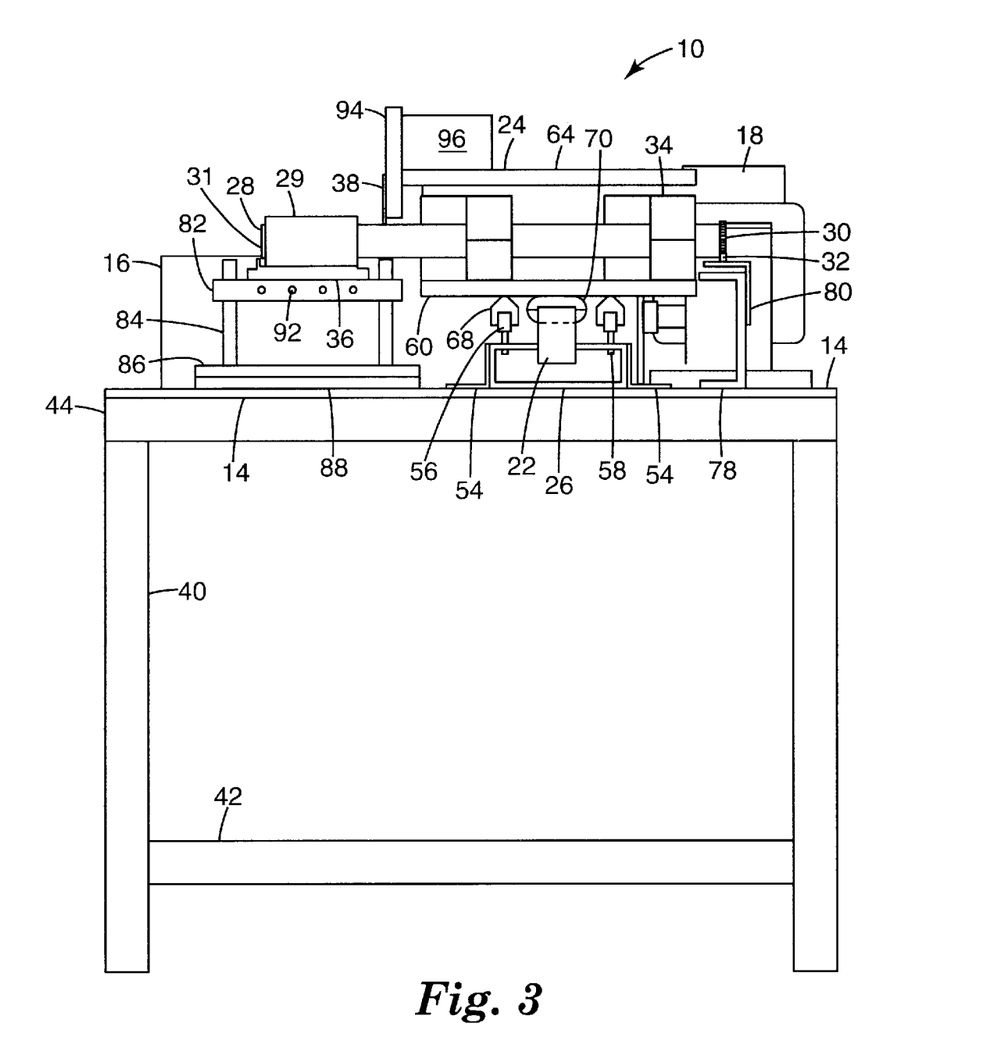
FIG. 3 is an end view of the embossing apparatus of FIG. 1.
Figure 4:
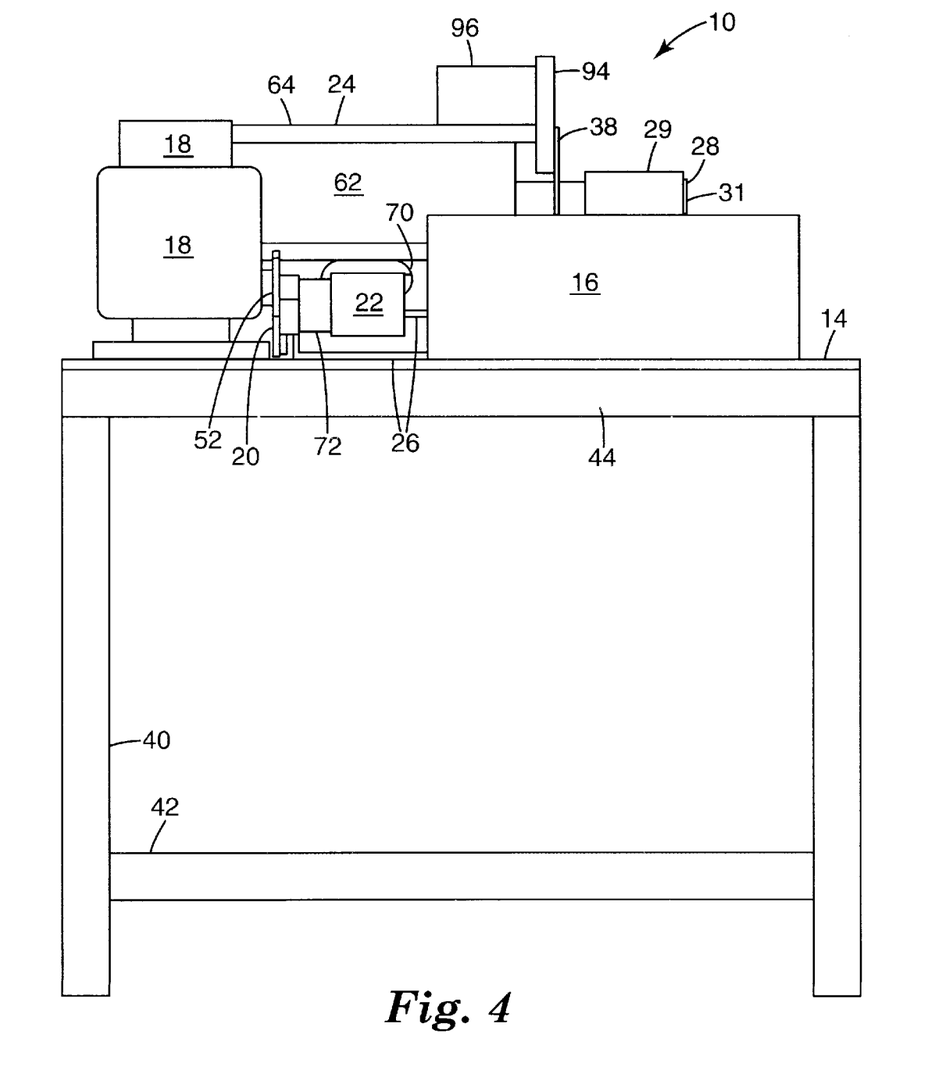
FIG. 4 shows the other end view of the embossing apparatus of FIG. 1.
Figure 5:
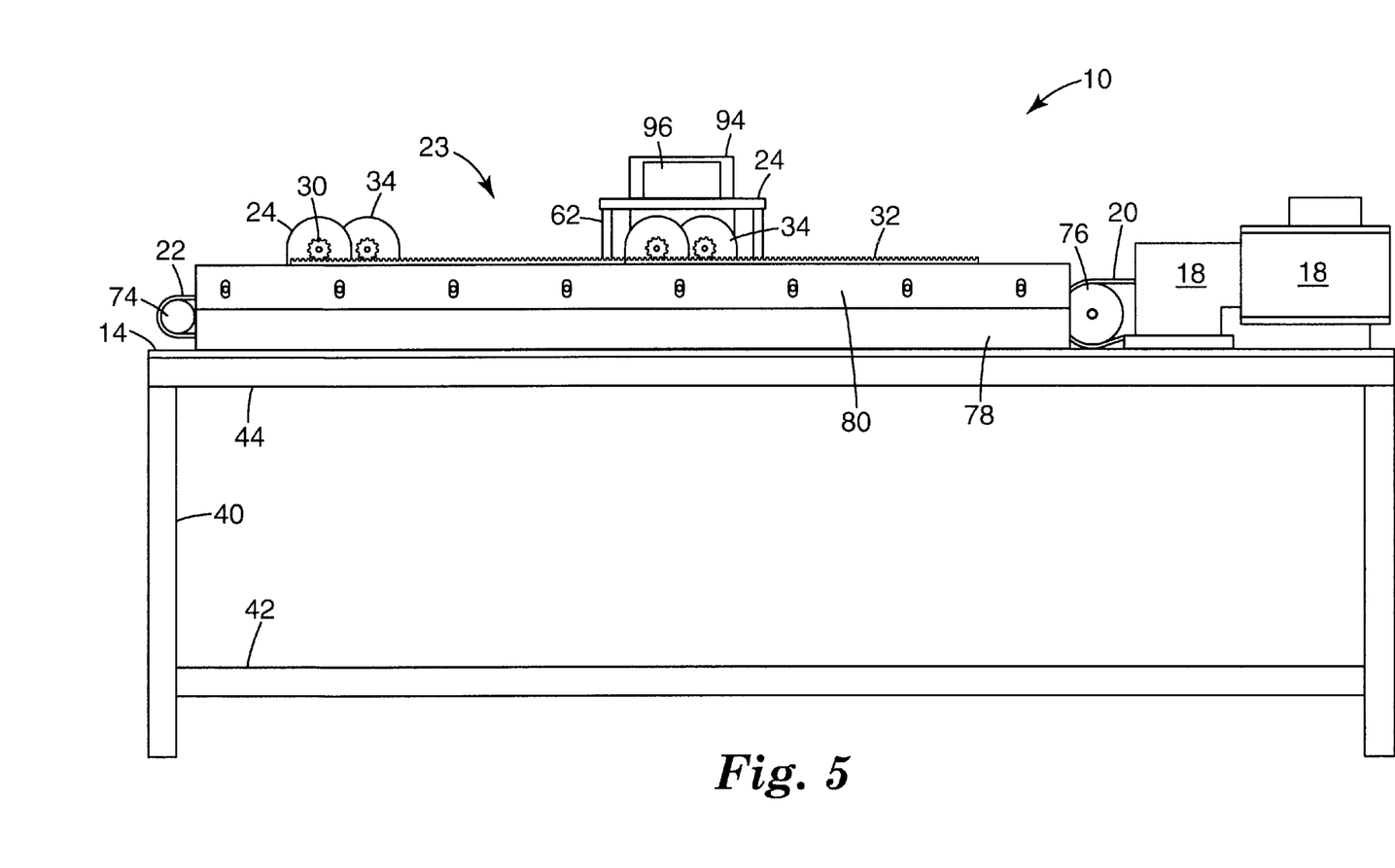
FIG. 5 is a side view of the rear of the embossing apparatus of FIG. 1.
Figure 6:
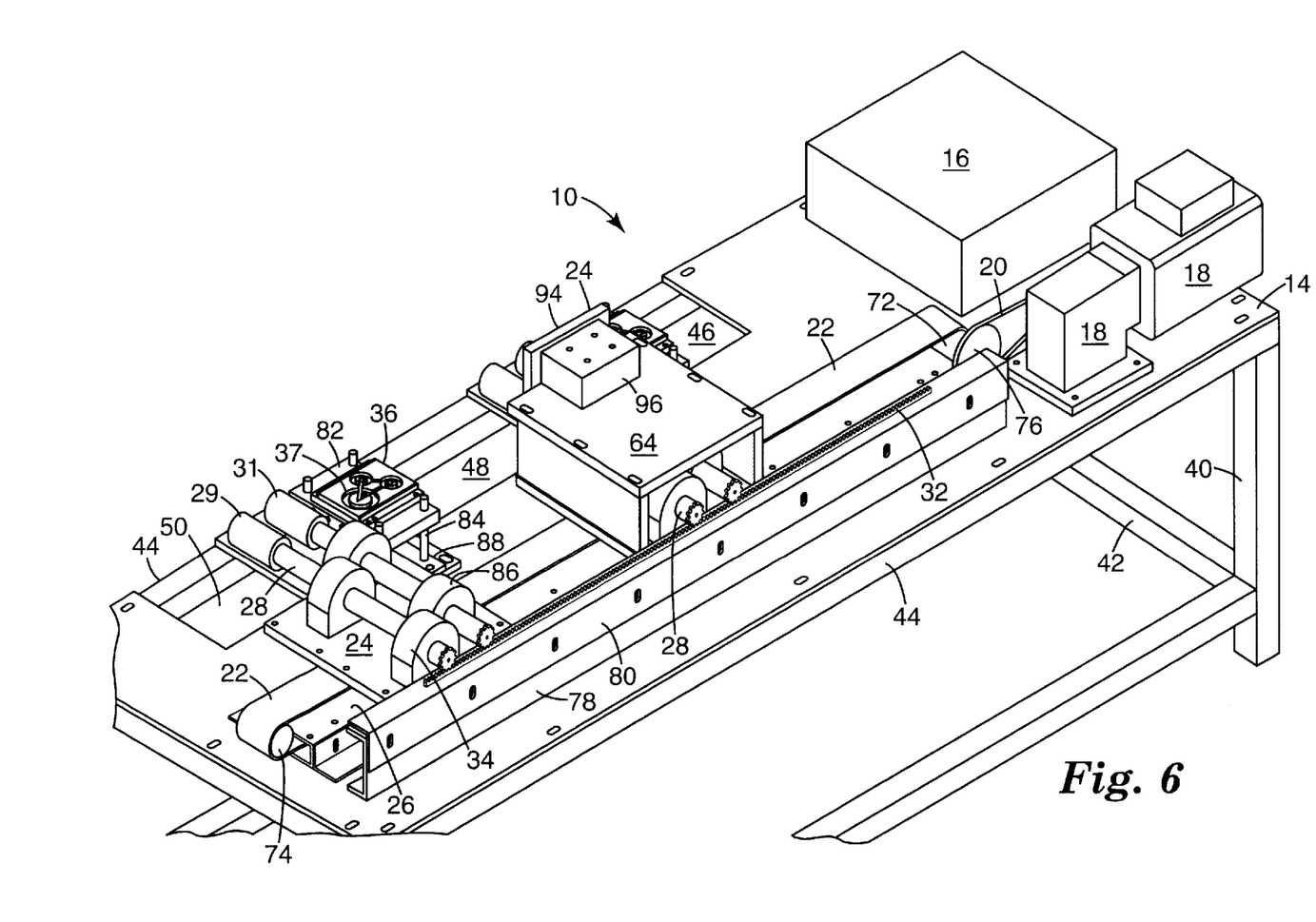
FIG. 6 is a perspective view taken from the rear of the embossing apparatus of FIG. 1.
Figure 7:
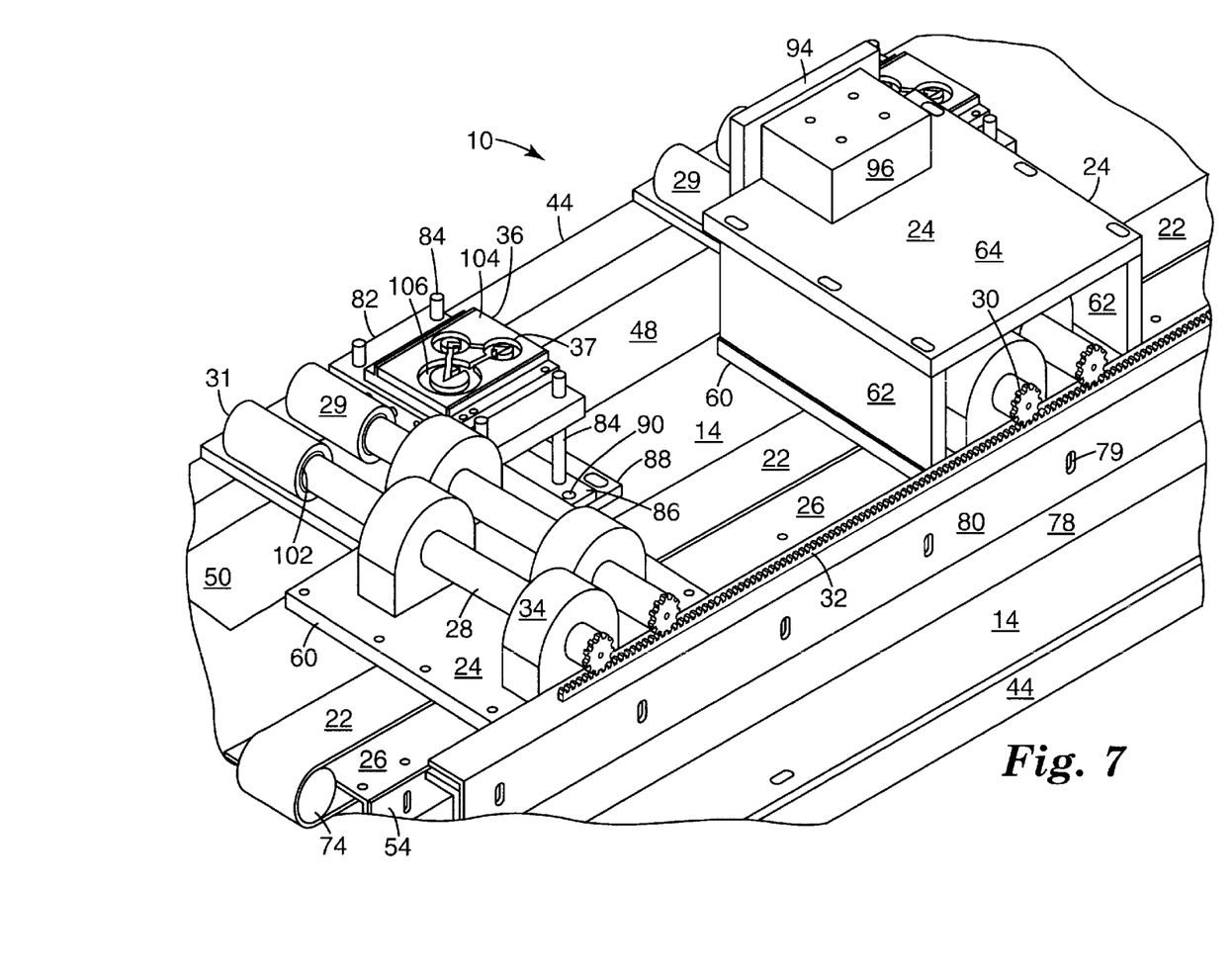
FIG. 7 is a detail perspective view taken from the rear of the embossing apparatus of FIG. 1.
Figure 8:
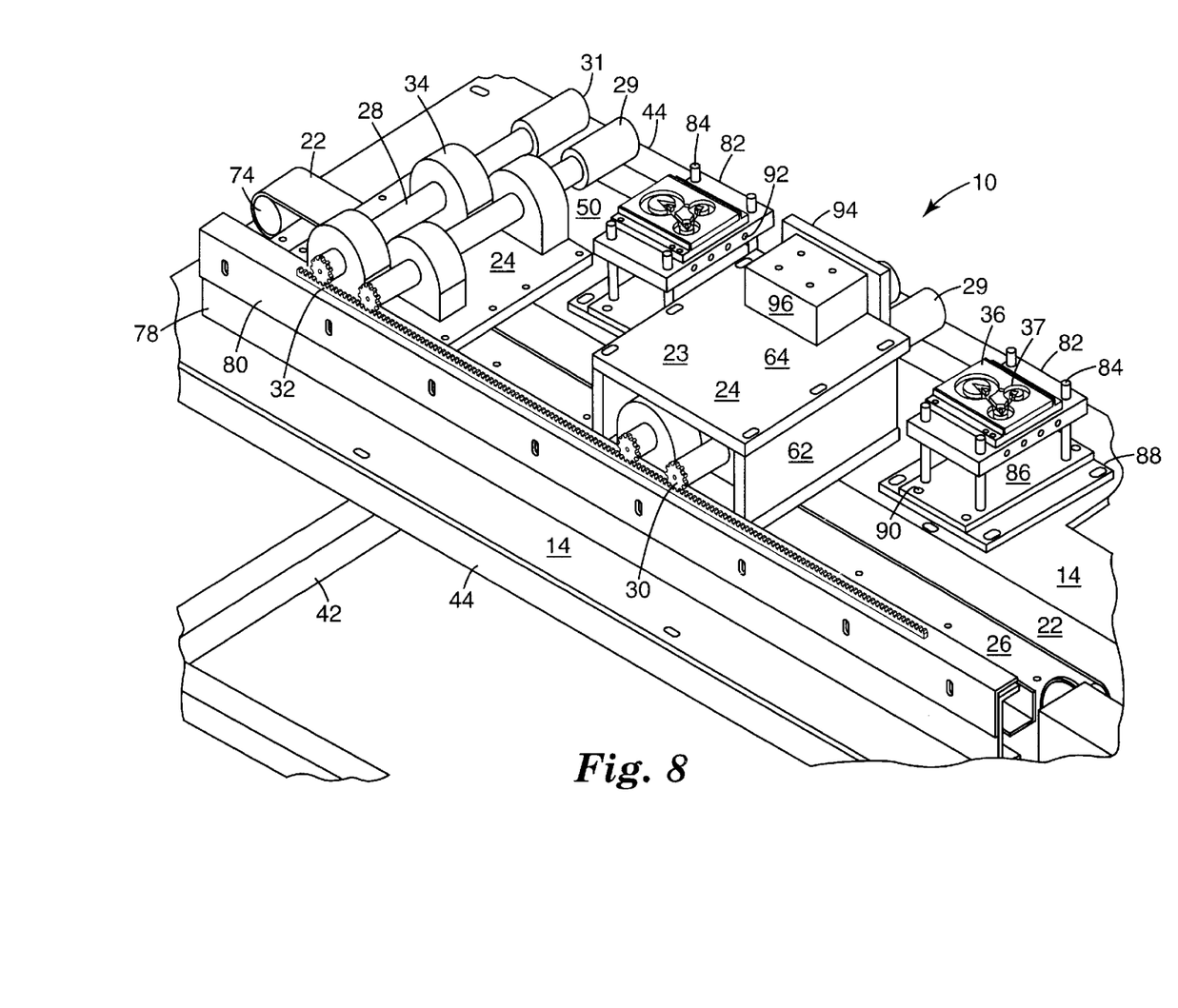
FIG. 8 is a detail perspective view taken from the rear of the embossing apparatus of FIG. 1.
Figure 9:
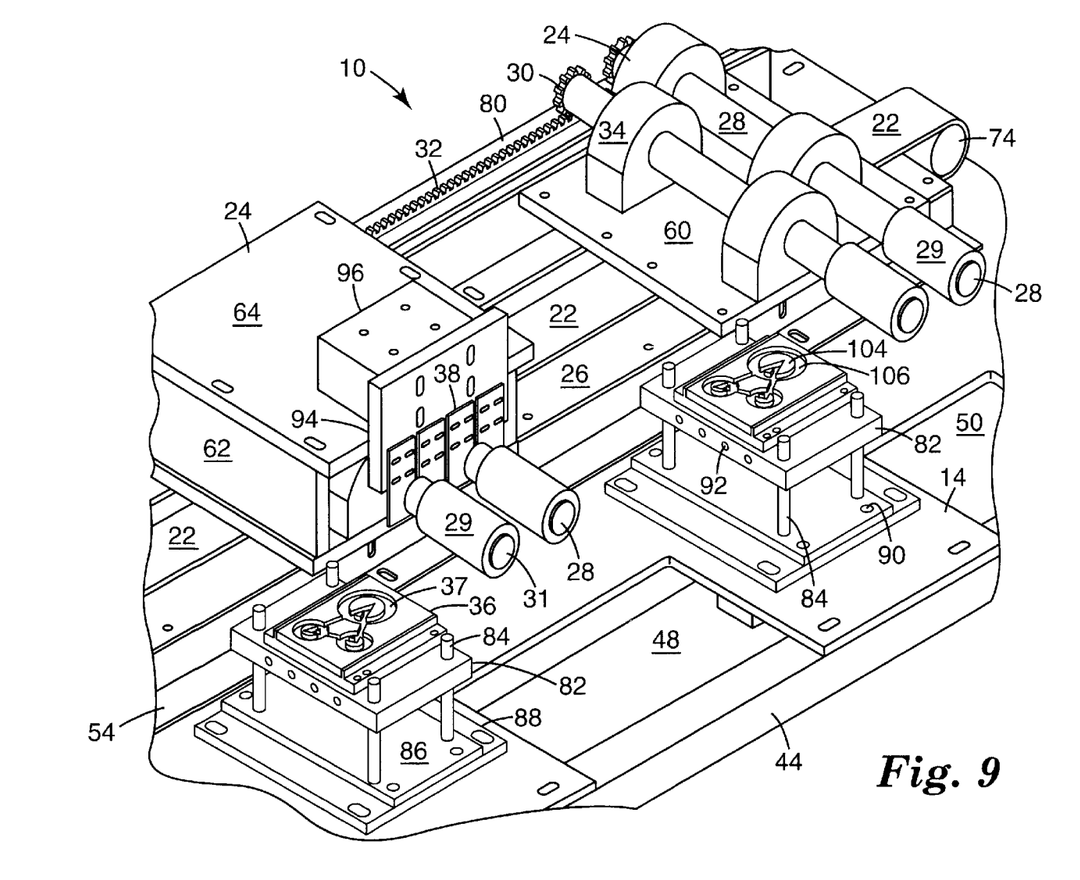
FIG. 9 is a detail perspective view taken from the front of the embossing apparatus of FIG. 1.
Figure 10:
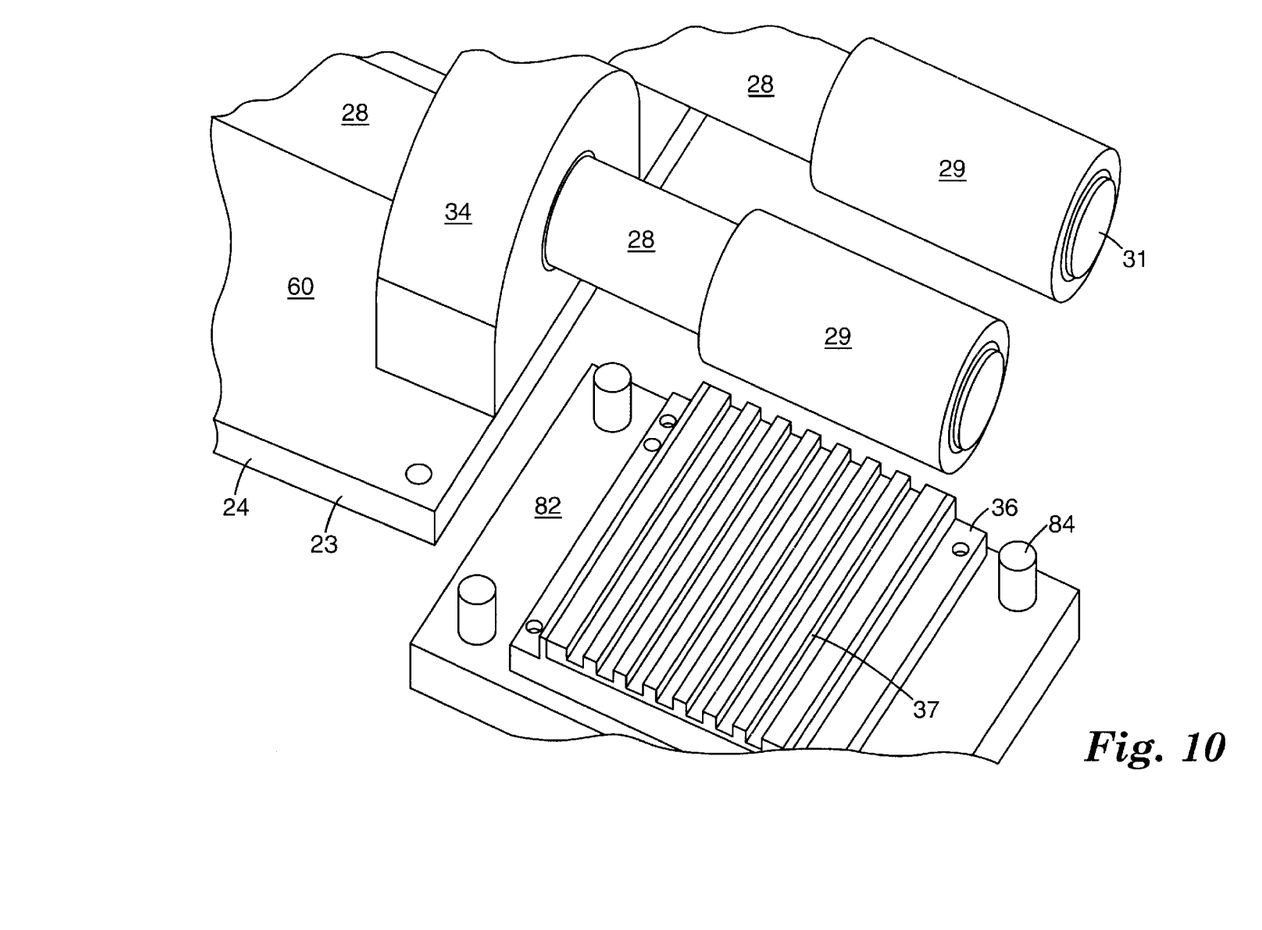
FIG. 10 is a more detailed perspective view taken from the front of the embossing apparatus of FIG. 1 and shows the shuttle assembly and paint rollers approaching the die transfer plate.

Shuttle assembly 23 includes the shuttle chain 22, shuttles 24, and slide bed 26. Shuttle assembly 23 further includes a pair of elongate angle irons 54 fixed to the base plate 14. Sandwiched between the elongate angle irons 54 is the slide bed 26. Slide bed 26 is an open ended tube that is rectangular in cross section. Slide bed 26 abuts base plate 14. As best seen in FIG. 3, shuttle assembly 23 further includes a pair of slide rails 56 mounted on the slide bed 26 via threaded pin connectors 58 such that the slide rails 56 may be vertically adjustable.

Shuttle 24 is formed as an open ended housing which includes a base plate 60, side plates 62, and an upper plate 64. A pair of slide rail receptors 68 are fixed to base plate 60 for receiving slide rails 56. A pinching mechanism 70 is further fixed to the base plate 60 and includes a pair of half members that pinch the shuttle chain 22 between them and interlock with the shuttle chain 22.

Shuttle chain 22 rides on and between a first toothed drive shaft 72 and a second toothed passive shaft 74. Shafts 72, 74 are journaled to plates fixed to base plate 14. Toothed drive shaft 72 includes a sprocket 76 that engages drive chain 20. Shuttle chain 22 rides within and above of slide bed 26 so as to isolate the portions of the chain 22 running in the opposite directions.

Shuttle assembly 23 further includes a rack gear first elongate base portion 78 fixed to base plate 14. Base portion 78 is C-shaped in section. Vertically adjustably mounted on the base portion 78 via slot and pin connector mechanisms 79 is a rack gear second elongate base portion 80. Second base portion 80 is L-shaped in section. Rack gear 32 is mounted on the L-shaped base portion 80.

As indicated above, shuttle 24 includes the pair of rotator shafts 28 mounted in bearings 34. Rear end of rotator shaft 28 includes the spur gear 30. Spur gear 30 engages rack gear 32 such that the shaft 28 is trained relative to the base 14. As the drive chain 22 pulls shuttle 24 in either of the directions, rotator shaft 28 is turned by such engagement between spur gear 30 and rack gear 32 so as to turn the paint rollers 29 which roll across the die transfer plates 36.

Shuttle assembly 23 further includes position locator sensors (not shown). Position locator sensors may be located in shuttle 24 and cooperating sensors may be fixed on rails 56, angle iron supports 54 or in box 26. Position locator sensors are preferably used to coordinate the timing of the operation of ejector plates 38 for the ejection of the paint roller covers 29.

Figure 11:
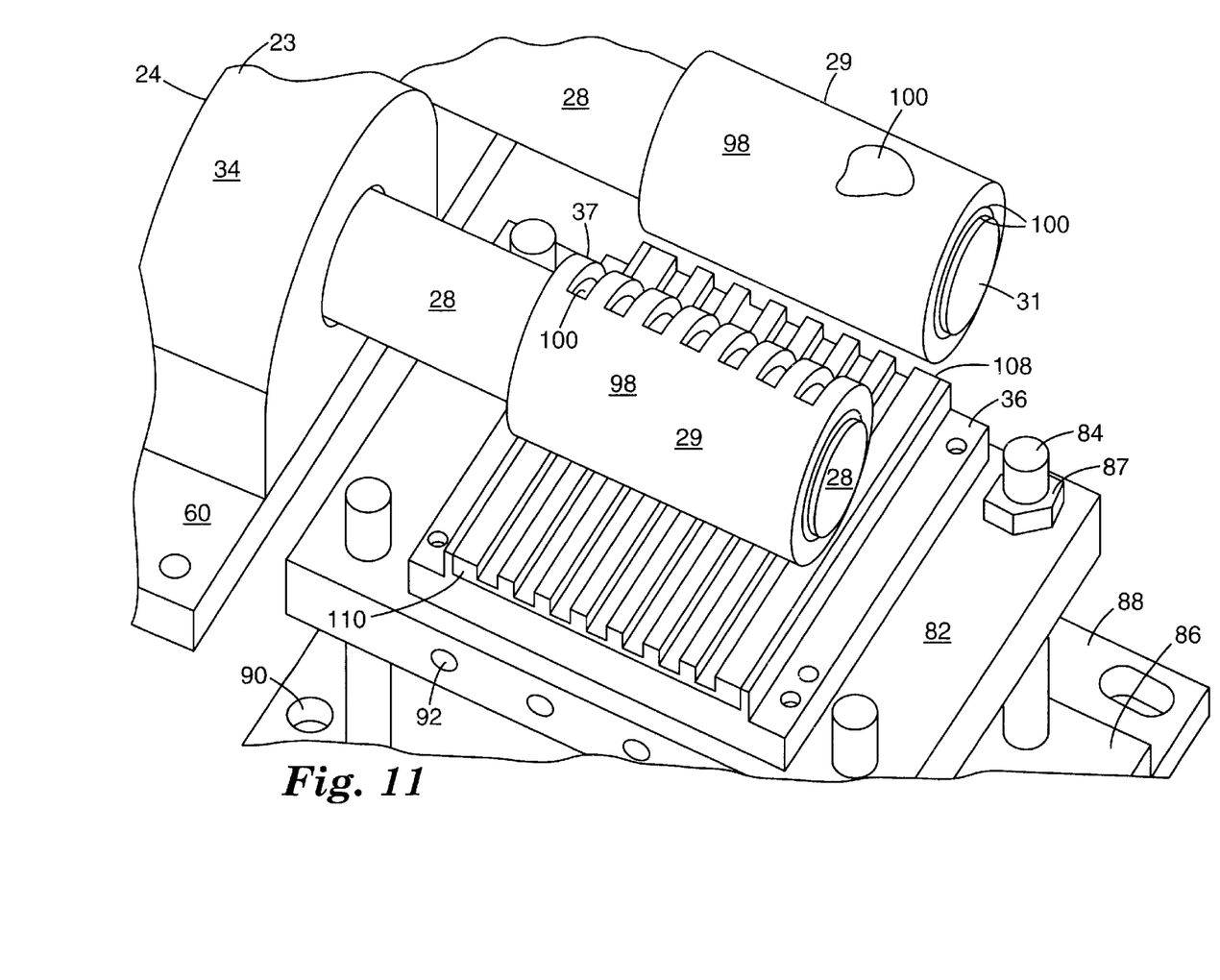
FIG. 11 is a view similar to that of FIG. 10 and shows one paint roller being embossed and the other paint roller approaching the die transfer plate.
Figure 12:
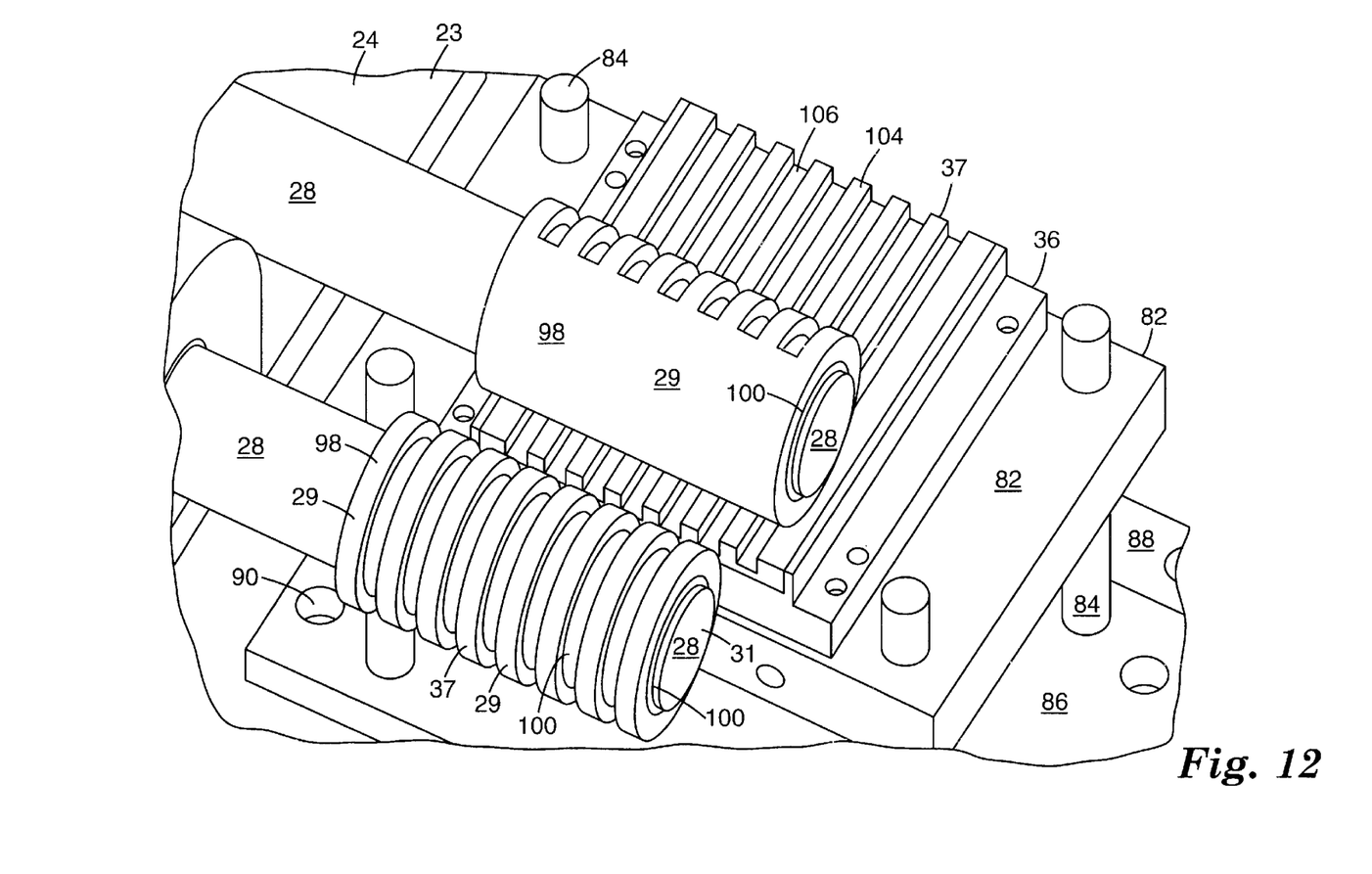
FIG. 12 is a view similar to that of FIG. 10 and shows one paint roller immediately after being embossed and the other paint roller in the process of being embossed.

Die transfer plate 36 is mounted on heater plate 82 which in turn is mounted on a set of four threaded columns 84, which in turn are mounted on heater adjustment plate 86, which in turn is laterally and longitudinally adjustably mounted on heater base plate 88, which in turn is mounted on base plate 14. Heater plate 82 is incrementally drawable towards and away from heater adjustment plate 86 and thus base plate 14 to adjust the height of the die transfer plate 36 relative to the paint rollers 29. Such height adjustment is accomplished by providing at least a pair of threaded nuts (not generally shown) on each of the columns 84 and by pinching the die transfer plate 36 between each of the respective pairs of threaded nuts. One such nut 87 is shown in FIG. 11 to illustrate that the height adjustment is an incremental adjustment. Height adjustment of die transfer plate 36 controls the pressure of the engagement between the plate 36 and the roller 29. Further, height adjustment may control the depth of the embossments in a substrate or nap 98 on roller cover 29 so as to form embossments in nap 98 which terminate short of a roller base 100.

Heater adjustment plate 86 is removably engaged with heater base plate 88 and is further laterally and longitudinally (i.e., right and left and in and out) adjustable relative to heater base plate 88 via pin and slot combinations 90 to provide for lateral and longitudinal adjustment of die transfer plate 36 relative to roller cover 29. Heater base plate 88 is removably engaged with base plate 14.

Heater plate 82 includes a set of four electric resistor elements 92 to heat the heater plate 82 to in turn heat the die transfer plate 36. Preferably, the die transfer plate 36 is of a temperature sufficiently high to quickly melt the nap 98 of the paint roller cover 29 and sufficiently low so as not to burn the nap 98 or base 100. Preferably, the temperature of the die transfer plate 36 is between about 250 degrees F. to about 600 degrees F. More preferably, the temperature is between about 270 degrees F. and about 560 degrees F. Most preferably, the temperature is between about 325 degrees F. and about 475 degrees F. Die transfer plate 36 is preferably formed of aluminum.

It should be noted that the temperature set by the control unit 16 may not be relied upon. Aluminum is a heat sink. Temperature readings may be most accurate if taken directly from the die transfer plate 36 itself.

It should further be noted that the temperature of the die transfer plate 36 may be dictated by the type of fiber of nap 98. Such fiber may be a natural or synthetic fiber. A synthetic, plastic fiber is preferred. Polyethylene, polypropylene, and polycarbonate fibers are most preferred.

It should further be noted that the temperature of the die transfer plate 36 may depend upon the thickness of nap 98. Preferably, the thickness of nap 98 is between about 3/8 inches and about 3/16 inches.

The time of engagement of the paint roller cover 29 on die transfer plate 36 is preferably about 0.5 seconds to about 20 seconds and more preferably about two seconds to about ten seconds. An excessively long engagement may burn the nap 98 or roller base 100. An excessively short engagement may incompletely melt the desired portions of nap 98 and lead to an incomplete design transfer.

Besides time and temperature, pressure of engagement between the roller cover 29 and die transfer plate 36 is a parameter to be taken into consideration. At high temperatures, it may be desirable to set the pressure of such engagement fairly high and to quickly engage the roller cover 29 and the die transfer plate 36.

The design 37 of the die transfer plate 36 is preferably machined into die transfer plate 36. Instead of being machined in, the design 37 may be cut into the plate 36 with a laser or etched in chemically.

Ejector wiper plates 38 are effectively piston heads mounted on piston shafts extending through guide holes in ejection guide plate 94. Ejection guide plate 94 is fixed to upper plate or ejection base plate 64. Pneumatic piston and cylinder mechanisms for the ejector wiper plates 38 may be located in pneumatic housing 96 mounted on ejection base plate 64. Ejector wiper plates 38 annularly confront the rotatable shaft 28 and are slideable along the rotatable shaft 28 from the ejector guide plate 94 to a distal end 31 of the rotatable shaft 28 so as to completely push the paint roller cover 29 off the rotatable shaft 28 so that the paint roller cover 29 falls by gravity off the rotatable shaft 28. It should be noted that the ejector wiper plates 38 annularly confront the rotatable shaft 28 for about 270 degrees about the rotatable shaft 28. Such an annular confrontation terminates short of a bottom portion of rotatable shaft 28 to permit the wiper plates 38 to be spaced from die transfer plate 36 as such wiper plates 38 wipe off the roller cover 29 and "wipe over" without touching the die transfer plate 36.

Paint roller 29 or paint roller cover 29 includes a nap 98 and a cylindrical base 100. Nap 98 may be a natural or synthetic fiber. Cylindrical base 100 may be a hard or semi-rigid plastic or formed of a hard or semi-rigid paper base. Rotator shaft 28 includes removably fixed thereto a ring 102 (shown in FIG. 7) against which the cylindrical base 100 of the paint roller 29 abuts as the paint roller 29 is slid onto the rotator shaft 28 so that the paint roller 29 may be quickly slid onto the rotator shaft 28 to the proper distance. Transverse movement of rotator shaft 28 may be prevented by rings removably fixed to rotator shaft 28 on either side of bearings 34.

The design 37 of the design transfer plate 36 includes relatively raised portions 104 and relatively low portions 106. The depth of such relatively low portions 106 is preferably greater than the height or radial distance of nap 98 from base 100 so as to preferably leave untouched the outer surface of the nap portions which extend into the relatively low portions 106. Relatively raised portions 104 that melt the portions of the substrate or nap 29 impress or emboss such design 37 into the nap 98.

Die transfer plate 36 preferably has a nonstick coating of a heat resistant polymer or copolymer. More preferably, the heat resistant polymer or copolymer is a fluoroplastic. Most preferably, the fluoroplastic is PTFE.

The length of the die transfer plate 36 is preferably exactly the circumference of the outer surface of the cylindrical base 100 so that, after rolling, a nap design portion at zero degrees matches such nap design portion at 360 degrees. In other words, the distance between parallel edges 108 and 110 of die transfer plate 36 is exactly equal to the circumference of the outer surface of the cylindrical base 100. In still other words, the design or pattern 37 that is transferred to the nap 98 has no distinguishable starting point and no distinguishable ending point. A continuous pattern, continuous for more than 360 degrees about the nap 98, may be formed.

In operation, the temperature of the die transfer plate 36 is selected in light of the material to be embossed, such as the material forming nap 98. The speed of the roll of the nap 98 across the die transfer plate 36 is also selected by adjustment of the speed reducer or gearing in the motor unit 18. Accordingly, a relatively slow roll may be provided across a relatively hot die transfer plate 36 or a relatively fast roll may be provided across a relatively cold die transfer plate 36. Or a relatively fast roll may be provided across a relatively hot die transfer plate 36. Or a relatively slow roll may be provided across a relatively cold die transfer plate 36. Further parameters to select are the pressure of the engagement between the die transfer plate 36 and the roller 29 (accomplished by selecting the height of the die transfer plates 36) and the timing of the ejection of the paint rollers 29 after embossing by the ejector wiper plates 38. Further as to pressure, a quicker embossment step may be provided by selecting a relatively high temperature for the die transfer plate 36 and a relatively high pressure engagement between the plate 36 and the roller 29.

After the parameters have been selected, the paint rollers 29 are fed onto the rotator shafts 28, such as by hand or robotic mechanism, so as to abut against rings 102. The paint rollers 29 fit with sufficient friction on the shaft 28 so as to be difficult to rotate by hand. Such friction minimizes a spinning of the roller 29 relative to the shaft 28, maximizes the ease of axially pushing the roller 29 onto the shaft 28 by hand and maximizes the ease of axially pushing of the roller 29 off the shaft 28 via the ejection plates 38. Drive belt 22 then pulls the shuttle 24 in the direction of die transfer plates 36, thereby drawing the spur gears 30 across gear rack 32, thereby in turn rotating the rotator shafts 28 and paint rollers 29. Paint rollers 29 thereby are rolled across die transfer plates 36 by the rotator shafts 28. As the naps 98 roll across the hot die transfer plates, the relatively raised portions 104 impress the design 37 into the naps 98 by melting the fibers of the nap 98. After each of the paint rollers 29 is rolled across its respective die transfer plate 36, its respective ejector wiper plate 38 is extended to the distal end 31 of shaft 28 to push the paint roller 29 off its respective rotator shaft 28. Such paint roller 29 then falls through its respective cut-out portion 46 or 48 or 50.

An unembossed paint roller 29 is then placed preferably immediately on the rotator shaft 28 such that such unembossed paint roller 29 is placed on the shaft 28 after an embossed paint roller 29 has been ejected from such rotator shaft 28 and prior to the rotator shaft 28 returning back across the die transfer plate 36. In other words, paint rollers 29 may be embossed as the shuttle 24 slides in one direction and again as the shuttle 24 slides in the opposite direction. Embossed paint rollers 29 may thus fall through each of the cut-out portions 46, 48, and 50 and are almost immediately ready for shipment or use, such as use with a bifurcated paint roller tool.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, land all changes which come within the meaning and range of equivalents of the claims are intended to be embraced therein.

I claim:

1. An apparatus for embossing a cylindrical paint roller cover, comprising, in combination:

a) a base;

b) a die transfer plate engaged to the base;

c) a shuttle moveably engaged to the base;

d) a rotatable member rotatably engaged to the shuttle, the rotatable member having a portion receiving a paint roller cover, a distal end portion and an axis, the rotatable member and a paint roller cover received of the rotatable member relative to the die transfer plate in a direction transverse to the axis of the rotatable member when the shuttle moves relative to the base, the paint roller cover rolling over the die transfer plate to impress a design of the transfer plate into the paint roller cover;

e) a stop disposed axially inwardly from the distal end portion of the rotatable member to stop axial feeding of the paint roller cover onto the rotatable member from the distal end portion in order to properly position the paint roller cover on the rotatable member with respect to the die transfer plate; and f) an ejector that provides for the removal of the paint roller cover from the rotatable member, the ejector including an ejector element that at least partially annularly confronts the rotatable member, with the ejector element being cooperable with the stop and axially slideable along the rotatable member to the distal end portion to move the paint roller cover off the rotatable member.

2. The apparatus of claim 1 wherein the die transfer plate is heated such that portions of the paint roller cover are heated to form the design therein.

3. The apparatus of claim 1 wherein the shuttle draws the rotatable member across the die transfer plate in a first direction transverse to the axis of the rotatable member and wherein the shuttle further comprises bidirectional means for drawing the rotatable member across the die transfer plate in a second direction transverse to the axis of the rotatable member that is opposite the first direction, resulting in a reciprocating back and forth movement of the rotatable member across the die transfer plate.

4. The apparatus of claim 1 wherein the paint roller cover includes a cylindrical base and a nap engaged to the base.

5. The apparatus of claim 1 wherein the die transfer plate is adjustable in a direction towards and away from the base, in a direction laterally along the base, and in a direction longitudinally along the base.

6. The apparatus of claim 1, wherein the ejector element reciprocates axially along the rotatable member from a first position axially inward from the stop to a second position at the distal end portion of the rotatable member.

7. The apparatus of claim 1, wherein the base comprises an opening positioned relative to the die transfer plate to facilitate collection of the embossed paint roller covers upon removal from the rotatable member by action of the ejector element.

8. The apparatus of claim 1 wherein the die transfer plate includes a pair of parallel edges, such that the paint roller cover is rolled from edge to edge of the die transfer plate, and wherein the paint roller cover has an outer circumference and a set depth running radially inwardly from the outer circumference, with said depth defining the depth of embossing by the die transfer plate and an inner circumference, the inner circumference being about the distance between the parallel edges of the die transfer plate so that the design impressed within the paint roller cover has no distinguishable starting and ending characteristics.

9. The apparatus of claim 8 wherein the inner circumference is exactly the distance between the parallel edges of the die transfer plate.

10. The apparatus of claim 1, wherein the rotatable member is moveably connected to the base, such that when the shuttle moves relative to the base, the rotatable member rotates.

11. The apparatus of claim 10 wherein the rotatable member is coupled by a spur gear to a rack gear on the base via engagement between the spur gear and the rack gear.

12. The apparatus of claim 1 wherein the die transfer plate comprises raised portions and lowered portions, with the raised and lowered portions forming a design to be embossed on the paint roller cover, and further comprising a nonstick coating on the raised and lowered portions.

13. The apparatus of claim 12 wherein the nonstick coating comprises a heat resistant coating.

14. The apparatus of claim 12 wherein the nonstick coating comprises a fluoroplastic.

15. The apparatus of claim 1 wherein the shuttle is moveably engaged to the base via a rotary to linear motion converting mechanism, rotation of which results in linear motion of the shuttle relative to the base.

16. The apparatus of claim 15 wherein the rotary to linear motion converting mechanism comprises a chain and sprocket drive.

17. The apparatus of claim 1 wherein the stop comprises a low profile relative to the rotatable member to facilitate cooperation with the ejector element.

18. The apparatus of claim 17 wherein the stop comprises an annular ring positioned about the rotatable member at a desired distance axially inward from the distal end portion.

19. The apparatus of claim 1, wherein the ejector element passes over the stop while sliding axially along the rotatable member toward the distal end portion.

20. The apparatus of claim 19, wherein the ejector element comprises a pair of wiper plates positioned on either side of the rotatable member axially inwardly from the stop, each wiper plate including a concave side edge shape d and sized to partially annularly confront the rotatable member and pass over the stop while sliding axially along the rotatable member.

21. The apparatus of claim 1, wherein the ejector is automatic.

22. The apparatus of claim 21, wherein movement of the ejector element is synchronized in relation to movement of the paint roller cover relative to the die transfer plate, such that the paint roller cover is removed by action of the ejector element substantially immediately after embossing of the paint roller cover by rolling over the die transfer plate.

23. The apparatus of claim 1 further comprising a plurality of rotatable members each rotatably engaged to the shuttle, and each having a portion for accepting roller cover, a distal end portion, and an axis.

24. The apparatus of claim 23 further comprising a plurality of die transfer plates each engaged to the base, wherein the plurality of rotatable members are drawable across the plurality of die transfer plates in a direction transverse to the axis if each rotatable member via the shuttle, such that each rotatable member is drawable across one of the plurality of die transfer plates.

25. The apparatus of claim 23 further comprising a plurality of shuttles for drawing the plurality of rotatable members across the die transfer plate.

26. The apparatus of claim 25 wherein each of the plurality of rotatable members is moveable engaged to the base.

27. The apparatus of claim 25 further comprising a plurality of die transfer plates each engaged to the base, wherein the plurality of rotatable members are drawable across the plurality of die transfer plates in a direction transverse to the axis of each rotatable member via the plurality of shuttles, such that each rotatable member is drawable across of the plurality of die transfer plates.

28. An apparatus for embossing a cylindrical paint roller cover, comprising, in combination:

a) a base including a plurality of openings;

b) a plurality of heated die transfer plates each having a design formed therein, with the heated die transfer plates being removably and adjustably engaged to the base;

c) a plurality of shuttles moveably engaged to the base;

d) a plurality of rotatable members rotatably engaged to each shuttle, the rotatable members each having a portion onto which one of a plurality of paint roller covers is received in frictional engagement, a distal end portion and an axis, each rotatable member and the paint roller cover received on that rotatable member moving across one of the plurality of die transfer plates in a direction transverse to the axis of the rotatable member when the plurality of shuttles move relative to the base, each paint roller cover rolling over one of the plurality of die transfer plates to impress a design of that die transfer plate into the paint roller cover;

e) a plurality of stops, each stop disposed axially inwardly from the distal end portion of one of the rotatable members to stop axial feeding of one of the paint roller covers onto that rotatable member from the distal end portion in order to properly position that paint roller cover on the rotatable member with respect to one of the plurality of die transfer plates; and f) an ejector that provides for the removal of the paint roller cover from each rotatable member after the design is impressed therein, the ejector including a plurality of ejector elements that each at least partially annularly confront one of the plurality of rotatable members, with each ejector element being cooperable with the stop disposed on that rotatable member and axially slideable along that rotatable member to the distal end portion to move the paint roller cover off of that rotatable member, each paint roller cover falling by its own weight through one of the plurality of openings in the base for collection of the embossed paint roller covers.

* * * * *